UNITED STATES PATENT OFFICE.

HARRY E. THORNBURGH, OF CHICAGO, ILLINOIS, ASSIGNOR TO PERFECTION EGG COMPANY, OF CHICAGO, ILLINOIS, A CORPORATION OF ILLINOIS.

PROCESS OF TREATING EGGS.

1,163,873.  Specification of Letters Patent.  Patented Dec. 14, 1915.

No Drawing.  Application filed April 14, 1913.  Serial No. 761,112.

*To all whom it may concern:*

Be it known that I, HARRY E. THORNBURGH, a citizen of the United States, residing at Chicago, in the county of Cook and State of Illinois, have invented a certain new, useful, and Improved Process of Treating Eggs, of which the following is a specification.

It is generally well recognized that eggs may be commercially maintained in a state of preservation for food purposes for a considerable length of time and without materially detracting from their healthful condition or their value as food. Among the various methods of preservation employed are the "freezing" and "drying" methods, in both of which the eggs are "broken," that is, removed from their shell, and the "liquid" eggs are then either maintained at a low temperature, or the greater portion of the moisture is abstracted therefrom resulting in a dry product. Eggs, however, from the moment they are produced are more or less infected with bacteria, which increase or multiply rapidly as the eggs become older, to a point where the eggs are rendered objectionable for food purposes. Especially is this bacteria growth or multiplication true to a marked and very rapid degree when the eggs are broken for drying or freezing purposes. In spite of all possible commercial precautions the "breaking" of the eggs exposes their liquid content to an enormous and generally rapid bacterial increase, the "liquid" eggs often spoiling or at least becoming objectionable for food purposes, within a comparatively short time after removal from the shell. In egg-breaking establishments the period of time elapsing between the breaking of the eggs and until their liquid content becomes frozen or dried, although very short, is sufficient in spite of attempted precaution to admit of a very considerable increase in bacterial activity and often to such an extent that the "liquid" eggs reach the freezing or drying machinery in such a high state of contamination as to be undesirable or objectionable for food purposes.

The object of the present invention is to suspend the development of the bacterial content of the eggs and perhaps destroy certain bacteria while such bacterial content is comparatively low in count or development and, therefore, such eggs are at such time still suitable for food purposes. This is especially advantageous where the eggs are to be broken for the purpose of freezing or drying and the treatment is administered prior to this breaking of the eggs; because it is well understood in the art that when eggs are broken there is a very rapid increase in development and in quantity of bacteria under ordinary conditions and if this can be avoided by treatment prior to breaking the eggs it is manifest that a great advantage can be attained.

The treatment given the eggs is to heat them while in their natural shell to a temperature below the coagulating point of the liquid content thereof, but above that temperature which is conducive to bacterial development, and thus arrest such development and to a certain extent destroy it. Experiments and practice demonstrate that when eggs are heated to a temperature within the range specified and the heat constantly maintained for a sufficient time, the bacterial content of the eggs will be either destroyed or partly destroyed and wholly rendered inactive. The degree to which these results are effected is, of course, dependent upon the degree of temperature within this range and upon the length of time to which the eggs are exposed to such temperature. It is quite important that such temperature to which the eggs are exposed shall be maintained below the coagulating point, which latter determines the upper limit of the effective range of such temperature, for the reason that if the liquid content of the eggs becomes coagulated by heat it becomes insoluble and, therefore, the product is materially lowered in value. Of course the lower limit of temperature must not fall below that point which would suspend the development of the bacteria. That is to say, the lower limit of temperature useful in this connection is that at which the bacteria cease to develop, and this I find under ordinary conditions to be about 105 to 110 degrees Fahrenheit. The length of time to which the eggs must be subjected to such temperature as is used varies approximately as the temperature varies within the range specified. For instance, the nearer the temperature employed is to the coagulating temperature (which is usually considered to be about 132 degrees Fahrenheit) the shorter time is required to effectually produce the results in the eggs; now, on the other hand, as the temperature approaches the lower limit of the range, the time period becomes proportionately longer. In practice under usual working conditions I have found that by heating the eggs in their shells for a period of from an hour to an hour and a half at a temperature slightly below the coagulating point (say, for instance, 130 degrees Fahrenheit), very satisfactory results are obtained. At this temperature for such a length of time the contaminating and detrimental bacteria are destroyed or rendered inactive, leaving such eggs in practically a stable or neutral condition so that they may be preserved for considerable time and even broken and handled in various commercial ways for an extended period without danger of much bacterial content developing or multiplying to a point where the eggs are rendered objectionable for food purposes. As before mentioned, at the lower limit of effective temperature, such, for instance, as around 105 to 110 degrees Fahrenheit, under ordinary conditions when treated for a considerable length of time, certain of the bacteria have their development arrested, but in practice it has been found preferable to employ a higher temperature as, for instance, around 130 degrees Fahrenheit, so as to secure a more complete suspension of development or destruction of the bacterial content. Furthermore, a temperature nearer the coagulating point reduces the time period to which it is necessary to subject the eggs and, therefore, this higher temperature is advantageous from an economical standpoint, as well as regards physical condition.

It will be obvious to those skilled in the art that no special construction, or apparatus, or particular agent is necessary for heating the eggs to be treated, for these practical essentials may be widely varied. For instance, the eggs may be subjected to the heat of live steam, or heated air, or hot fluid, but commercially it has been found more satisfactory to place the eggs in a vat of water maintained at a temperature preferably about 130 degrees Fahrenheit for the necessary length of time; if the water is maintained in a flowing state a further advantage arises from the fact that the shells of the eggs are thereby cleansed, reducing the likelihood of bacteria mechanically entering the liquid content when the eggs are broken. It is well recognized as a result of the experiments by the food authorities and in egg breaking establishments, that the danger of infection from the outside of the shells during the breaking operation may be materially reduced by insisting that the operators dry their finger tips before breaking the eggs. It will be noted, likewise, that the egg shells dry extremely rapidly on removal from the heating water. It has furthermore been found in practice that this heating process enables the operator to detect bad eggs more perfectly. It is to be further observed that after the eggs have been treated as above, if it is intended to break them, it is preferable of course to maintain the temperature as nearly uniform up to the time the liquid content is to be frozen or dried for while the treatment is very advantageous in suspending the development of deleterious bacteria and perhaps in destroying some of these bacteria, it is yet obvious that it will be more perfect in its operation if continued up to the time when the drying or freezing process takes its place.

What I claim is:

1. The process of treating eggs which consists in heating the eggs to a temperature below the point at which the liquid content coagulates, but above the temperature at which the bacterial content grows and multiplies for a period of time sufficient to render the bacteria content inactive and afterward breaking the eggs and subjecting the contents thereof to a preserving process.

2. The herein described process of neutralizing the bacterial content of "shell" eggs which consists in heating the eggs to a temperature of between substantially 110 degrees Fahrenheit, and 132 degrees Fahrenheit, and prolonging such treatment until the bacterial content is rendered inactive and afterward breaking the eggs and subjecting the contents thereof to a preserving process.

3. The process of preserving eggs, consisting in heating the liquid content of the egg while in its natural unbroken shell to a temperature lower than the coagulating point of said liquid content but higher than the temperature at which the bacterial content ceases to grow and multiply, constantly and persistently maintaining this temperature until the bacterial content is rendered inactive, and then, while at this temperature, breaking the egg and drying the liquid content thereof.

4. The process of treating eggs which consists of subjecting unbroken eggs to heat, breaking the eggs thus heated and subjecting the contents thereof to a preserving process while still heated.

5. The process of treating eggs which consists of maintaining the unbroken eggs at a temperature above the point at which the bacteria content thereof ceases to grow and below the coagulating temperature for a sufficient period of time to render the bacteria content of the eggs inactive, and then breaking the eggs and subjecting their contents to a preserving process while at such temperature.

6. The process of treating eggs which consists of maintaining them at a temperature below the coagulating point and above the temperature at which the bacteria content thereof ceases to grow while said eggs are being broken and subjected to a preserving process.

7. The process of treating eggs which consists of subjecting the unbroken eggs to a temperature between 110 degrees Fahrenheit and 132 degrees Fahrenheit for a period of approximately one hour, and then breaking the eggs and subjecting them to a preserving process while still substantially at said temperature.

8. The process of treating eggs which consists of subjecting the unbroken eggs to a temperature between 110 degrees Fahrenheit and 132 degrees Fahrenheit for a period of approximately one hour, and then breaking the eggs and drying the liquid content thereof while still substantially at said temperature.

In testimony whereof I have signed my name to this specification, in the presence of two subscribing witnesses, on this 11th day of April A. D. 1913.

HARRY E. THORNBURGH.

Witnesses:
GEO. H. ZENDT,
D. B. KILBOURNE.